March 10, 1970   R. J. KEOGH   3,500,095
MULTILAYER DISC ARMATURE FOR DYNAMO ELECTRIC MACHINE
Filed July 10, 1967   2 Sheets-Sheet 1

INVENTOR.
RAYMOND J. KEOGH
BY
Morgan, Finnegan, Durham & Pine
ATTORNEYS

INVENTOR.
RAYMOND J. KEOGH

United States Patent Office 3,500,095
Patented Mar. 10, 1970

3,500,095
MULTILAYER DISC ARMATURE FOR DYNAMO ELECTRIC MACHINE
Raymond J. Keogh, Huntington, N.Y., assignor to Printed Motors, Inc., New York, N.Y., a corporation of Delaware
Filed July 10, 1967, Ser. No. 652,139
Int. Cl. H02k *1/22, 3/04*
U.S. Cl. 310—268    10 Claims

ABSTRACT OF THE DISCLOSURE

A rotating electrical machine including a four-layer armature. Winding segments in two of the layers are interconnected to form a first closed series arrangement, winding segments in the other two layers are interconnected to form a second closed series arrangement, and the series arrangements are interconnected at regularly spaced intervals to form a parallel-wave armature winding.

---

This invention relates to electrical rotating machines, including ironless armatures. These machines usually include disc-shaped armatures, but are not limited to specific armature configurations.

Disc-type machines have been developed primarily as high-performance-servo machines, including low inertia ironless armatures. In one type motor, the armature conductors are arranged in two generally radial arrays which lie on opposite sides of an insulated carrier. Half of each armature turn is located on one side of the insulating carrier, and the other half of each turn is located on the other side. The individual winding segments are shaped in a wave configuration so that when interconnected in a two-layer armature, by means of bridging connections at the inner and outer circumferences of the winding, the winding segments form a closed wave winding.

Four-layer windings have also been developed to increase the number of armature conductors in the winding and thereby improve the motor performance. In the past, the four-layer armatures were arranged in a combination wave-lap configuration so that all armature turns would be connected in series. Two of the conductive layers include wave winding segments and the other two layers include lap winding segments. When interconnected to form a closed armature winding, all of the armature turns are connected in series alternating between wave armature turns and lap armature turns. The four-layer wave-lap winding increases the number of series connected armature turns and thereby increases the armature back EMF.

In small motors, the increased back EMF is an advantage, but in larger motors, it can become a disadvantage because of the increased difficulties of controlling the motor within the permissible voltage ratings of solid state control elements.

Also, in some motor applications high starting torques are required, and these high starting torques cannot readily be achieved in motors including four-layer wave-lap armature windings.

The motor in accordance with this invention includes an armature with four or more layers constructed using wave winding segments in each of the four layers. The armature turns instead of being connected in one series string, are paralleled into two interconnected sets of series windings. As a result, the number of armature turns in series is cut in half thereby reducing the back EMF to one-half. The resistance of the winding is reduced to approximately one-quarter and, therefore, for the same applied voltage, the current and starting torque are substantially increased. This motor provides substantially different operating characteristics when compared to the four-layer type motor but utilizes essentially the same wave winding segments as used in the wave-lap winding thereby adding motor production versatility.

The invention is described in greater detail in the following specification which sets forth an illustrative embodiment of the invention. The drawings form part of the specification wherein.

The armature in a disc-type machine includes a large number of generally radially extending conductors distributed evenly about an annular area that will be adjacent the magnetic pole faces in the completed machine. These conductors are interconnected to form a continuous closed armature winding. Successive conductors are displaced by a distance approximately equal to a distance between adjacent pole centers of the associated magnetic structure and are interconnected so that current flow is in one direction across the north magnetic poles and in the opposite direction across the south magnetic poles.

Figure 1:
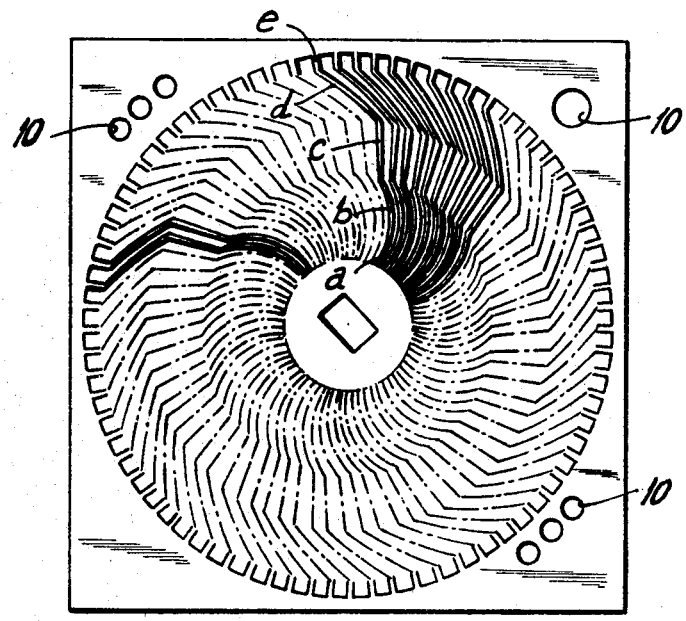
FIGURE 1 is a plan view illustrating the metal stamping used to form the conductor arrays in the armature.

The conductor arrays for the armature are conveniently formed by means of metal stampings such as illustrated in FIGURE 1. These stampings can be formed in a single stamping operation, or by a notching operation wherein a metal sheet, either copper or aluminum, is indexed to selected positions as the metal between adjacent winding segments is punched out in successive operations.

Each winding segment is generally Z shaped to form a wave-shaped winding segment. The center conductor portion of each segment is disposer radially but is somewhat skewed to provide better motor performance. An inner tab *a* is joined to the center portion *c* by an inner arcuate portion *b*, and an outer tab *e* is joined to the center portion by an outer arcuate portion *d*. The angular displacement between tabs *a* and *e* is in accordance with the number of poles in the magnetic structure and is approximately equal to the distance between adjacent pole centers. Thus, in an eight-pole machine, this angular displacement is approximately 45 degrees. The actual angular displacement differs somewhat so that the completed winding will be continuous and will be either retrogressive or progressive.

Figure 2:
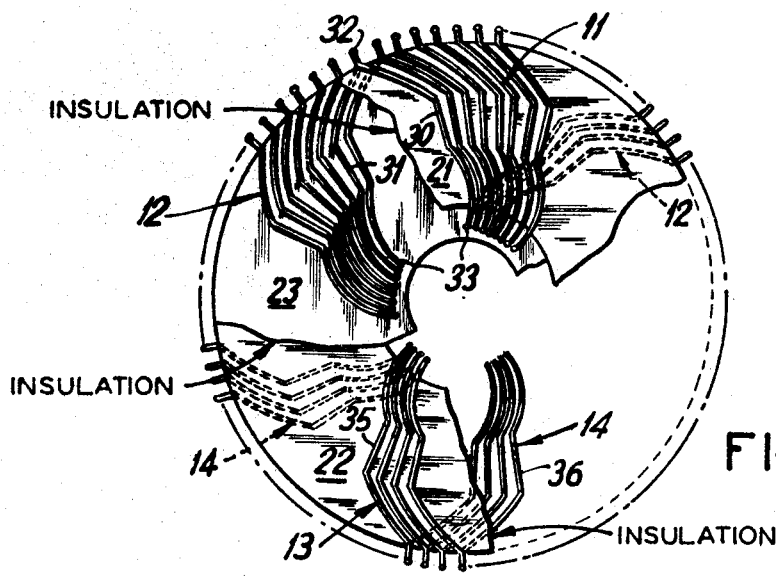
FIGURE 2 is a plan view, with portions broken away, illustrating the completed armature winding.
Figure 3:
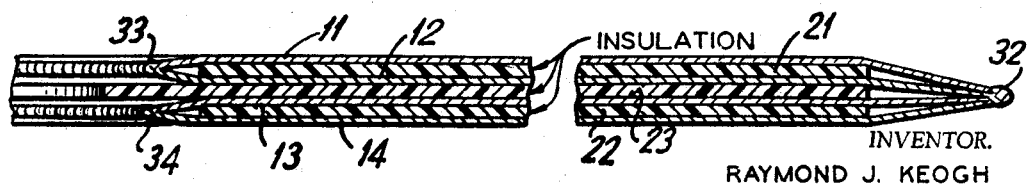
FIGURE 3 is a partial cross-sectional view of the completed armature structure.

Four stampings 11–14, such as shown in FIGURE 1, are bonded to intermediate insulated layers 21–23 and electrically interconnected to form the completed armature winding as illustrated in FIGURES 2 and 3. The top and third layers 11 and 13, respectively, are formed from stampings which are right-side up (as shown in FIGURE 1), while the second and bottom layers 12 and 14, respectively, are formed from stampings which are inverted, that is, rotated 180 degrees about an axis passing through the plane of the stamping. Thus, when a pair of winding segments 30 and 31 in the upper two layers, for example, are interconnected by a common outer tab connection 32, the winding segment in the top layer extends away from the outer tab in a clockwise direction, whereas the winding segment in the second layer extends away from the outer tab in the counterclockwise direction. The two winding segments when interconnected in this fashion form an armature turn which, for an eight-pole machine, spans approximately 90 degrees.

The four-layer structure is conveniently formed by first constructing two two-layer subassemblies. A pair of stampings 11 and 12 are bonded to opposite sides of an insulated annular disc 21 with the inner tabs aligned. This alignment is facilitated by appropriately located alignment holes 10 in the stamping. The center portion of the stamping is then blanked out to expose the aligned inner tabs. The inner tabs are then welded to form an inner set of bridging connections 33. The two-layer subassemblies used to make the four-layer armature winding are identical and each includes two stampings, one stamping inverted relative to the other.

The material surrounding the conductor arrays is not removed in the two-layer subassembly so that alignment holes 10 will be available for final alignment. The two-layer subassemblies are aligned and bonded to opposite sides of a central insulated annular disc 23. The waste material surrounding the conductor arrays is then removed and the outer tabs are brought into alignment and welded together to form the outer bridging connections 32. Each outer bridging connection includes four tabs, that is, one tab from each of the four layers.

The insulating discs can be made from a suitable insulating material impregnated with a partially cured epoxy resin. The stampings are bonded to the insulating discs by applying heat to thereby completely cure the epoxy resin. The outer and inner diameters of insulating discs 21 and 22 are selected so that the discs lie between the inner and outer tabs to thereby leave the tabs exposed for subsequent welding operations. The center insulating disc 23 has the same outer diameter, but can have a smaller inner diameter so that this disc extends beyond the inner tabs. As a result, the inner diameter of the center insulating disc can be used for centering the completed armature winding on the associated shaft and hub structure.

Figure 4:
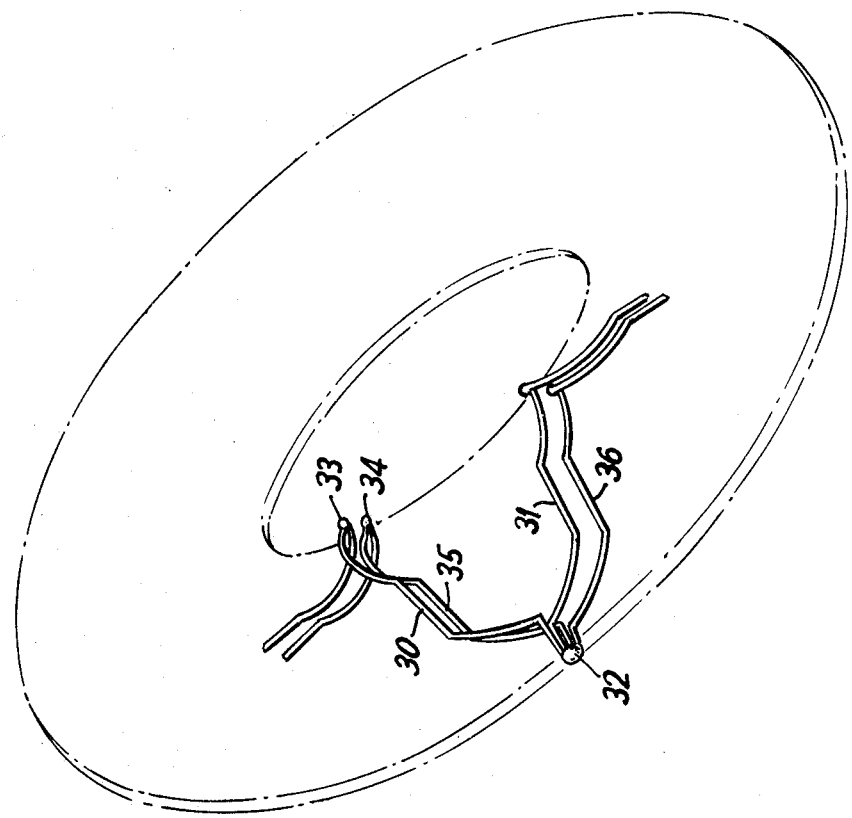
FIGURE 4 is a partial perspective view illustrating a few of the armature turns and their interconnection.

FIGURE 4 illustrates a portion of the completed winding showing the manner in which the winding segments are interconnected. Winding segments 30 and 31 in the top two layers are interconnected to form an armature turn and winding segments 35 and 36 in the lower two layers are likewise interconnected to form an armature turn which directly underlies the corresponding armature turn in the upper two layers. The inner bridging connections which connect successive armature turns remain separated, that is, a separate bridging connection 33 for the upper set of tabs and a separate bridging connection 34 for the lower set of tabs. This arrangement is advantageous because of the two-layer subassembly technique and because of the extremely close spacing between adjacent inner tabs. The four outer tabs after being aligned are interconnected through a single welded bridging connection 32 and, hence, the two armature turns referred to in FIGURE 4 are connected in parallel. The paralleling bridging connections occur at regularly spaced intervals throughout the winding. In other words, the armature turns are connected in parallel at the locations of each aligned set of outer tabs.

When this armature is compared to four-layer armatures of the prior wave-lap type, it is found to have half the number of turns in series and, therefore, provides half the back EMF. The armature resistance is reduced by a factor of four and, therefore, the starting torque of the motor is substantially increased.

The specifications of a motor constructed in accordance with this invention are as follows:

Stator: 8-pole, Alnico V, permanent magnets
Field strength: 5.9 kilogauss
Type of armature: 4-layer, parallel wave
Armature inside dia.: 1.6 inches
Armature outside dia.: 4.8 inches
Copper thickness: 12 mils/layer
Number of conductors/layer: 141
Armature resistance: .255 ohm brush terminal to brush terminal
Ke (back EMF): 5.8 volts/1000 r.p.m.

Figure 5:
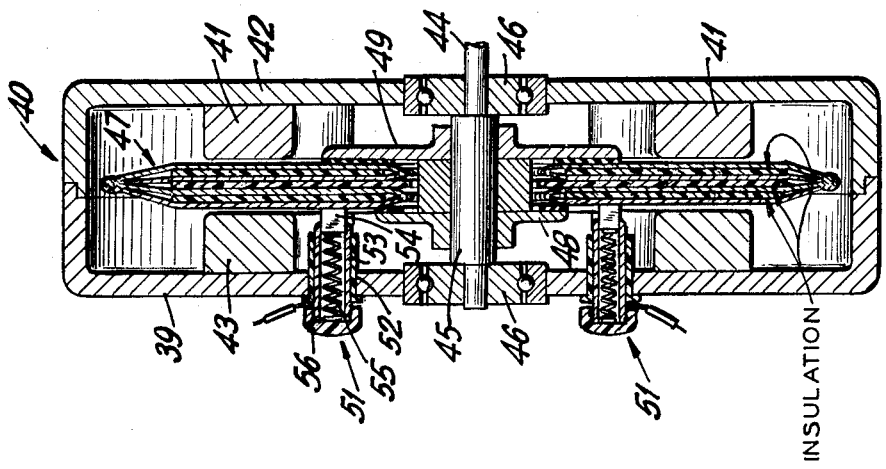
FIGURE 5 is a cross-sectional view of the completed motor including a four-layer armature in accordance with this invention.

The completed motor assembly is shown in FIGURE 5 and includes a housing 40 having two similar members each including a circular base plate and an integral cylindrical portion extending from the periphery. The illustrative motor is an eight-pole machine and therefore eight cylindrical slugs 41 of an aluminum-nickel-cobalt alloy material such as alnico are secured to one of the base plates 42. These magnetic slugs are evenly distributed to form an annular array of pole faces and are each secured to the base plate by means of an adhesive such as epoxy cement. The magnetic slugs are magnetized to provide pole faces of alternating north and south magnetic polarities. An iron ring 43 is secured to the other base plate 39 and is positioned directly opposite the annular array of pole faces to complete the magnetic path between adjacent pole faces and to provide a working air gap between the ring and the magnetic slugs.

The armature winding is mounted on a shaft 44 provided with an increased diameter portion 45 positioned between a pair of ball bearings 46 to prevent axial movement. The bearings are centrally mounted within suitable openings in the base plates. The armature winding 47, constructed in the manner illustrated in FIGURES 1–4, is clamped between a pair of flanges 48 and 49 of a hub structure which are rigidly secured to shaft 44. Dielectric spacers are positioned to insulate the armature winding from the hub structure.

Each of the brush holders 51 includes an insulated bushing 52 having an annular shoulder at one end so that the bushing can conveniently be inserted through a suitable opening in one of the base plates. A conductive metallic sleeve 53 is secured within the bushing and is dimensioned to accommodate a rectangular brush 54. The brush is urged toward the armature by means of a compression spring 55 located between the brush and an insulated cap 56 threaded onto the end of sleeve 53 which extends beyond the end of bushing 52. The electrical leads are attached to conductive sleeves 53 and the electrical circuit to the winding segments is completed via sleeves 53 and brushes 54. Flange 49 preferably has sufficient diameter to provide structural backing for the armature in the area opposite the brushes.

The armature can be properly commutated with two brushes bearing directly upon the winding segments. These brushes are angularly separated by a distance equal to the annular distance between adjacent pole centers which, for an eight-pole machine, is approximately 45 degrees. The brushes are located to contact neutral conductors of the winding, that is, to contact conductors located midway between pole centers.

The current flow from one brush to the other essentially follows four parallel paths through the winding. The winding segments in two of the layers 11 and 12 (FIGURES 2 and 3) are interconnected to form successive armature turns, each such armature turn including a winding segment in layer 11 and a winding segment in layer 12. The armature turns in these two layers are interconnected to form a first closed series arrangement with successive armature conductors, i.e., the straight portions c of the winding segments, separated by a distance approximately equal to the distance between adjacent pole centers. Current entering the positive brush splits and flows through the first closed series arrangement to the negative brush in two parallel paths. The winding segments in the other two layers 13 and 14 are similarly interconnected to form successive armature turns of a second closed series arrangement. The first and second closed series arrangements are interconnected at regularly spaced intervals by means of the outer bridging connections. Thus current entering the positive brush also flows through the appropriate outer bridging connection, splits, and then flows to the negative brush through two parallel paths in the second closed series arrangement.

Additional brushes may be added to reduce the brush current density. The additional positive and negative brushes, respectively, are separated by the span of an armature turn which, for an eight-pole machine, is approximately 90 degrees.

Although the invention is described with respect to a specific embodiment, it should be obvious that there are numerous other embodiments within the scope of the invention. For example, the number of layers in the armature can be further increased to provide a motor with the same back EMF but a still lower armature resistance. The armature can also be constructed in other than the flat disc configuration specifically illustrated. The invention is more specifically defined in the appended claims.

What is claimed is:

1. An armature for an electrical rotating machine comprising
   at least four conductor layers each including an array of wave winding segments, each of said winding segments
      having substantially the same wave winding configuration, and
      having connection tabs at the ends thereof;
   insulating means for electrically insulating winding segments in adjacent conductor layers;
   connecting means for interconnecting said winding segments with
      the wave winding segments in two of said conductor layers being interconnected to form armature turns of a first closed series arrangement, each such armature turn including a winding segment in each of said two layers,
      the wave winding segments in another two of said conductor layers being similarly interconnected to form a second closed series arrangement, and
      said first and second series arrangements being electrically connected in parallel at a plurality of regularly spaced intervals;
   whereby said winding segments are interconnected to form a closed, parallel, armature winding.

2. An armature according to claim 1 consisting of four conductor layers.

3. An armature according to claim 1 wherein each of said conductor layers is planar and said wave winding segments are disposed radially.

4. An armature according to claim 1 wherein each armature turn of said first series arangement is electrically connected to an armature turn of said second series arrangement.

5. A disc-type armature for a multipole electrical rotating machine comprising
   four parallel conductor layers each including a generally radial array of winding segments, each of said winding segments
      having substantially the same wave configuration, and
      having an inner and an outer connection tab;
   insulation means for electrically insulating winding segments in adjacent conductor layers;
   bridging connections coupling said tabs
      for interconnecting winding segments in two of said conductor layers to form armature turns of a first closed series arrangement, each such armature turn including a winding segment in each of said two layers spaced in accordance with the distance between adjacent pole centers,
      for interconnecting winding segments in the other two of said conductor layers to similarly form a second closed series arrangement, and
      for interconnecting said first and second closed series arrangements at a plurality of regularly spaced intervals;
   whereby said winding segments are interconnected to form a closed parallel-wave winding.

6. A disc-type armature according to claim 5 wherein each of said conductor layers is made from a similar metal stamping.

7. A disc-type armature according to claim 5 wherein bridging connections couple inner tabs of two of said conductor layers,
   separate bridging connections couple inner tabs of the other two of said conductor layers, and
   bridging connections couple outer tabs in each of said four conductor layers.

8. An electrical machine comprising
   a stator including an annular array of magnetic pole faces of alternating magnetic polarities;
   an armature mounted for rotation adjacent said pole faces and including
      four parallel conductor layers each including a generally radial array of winding segments, each of said winding segments
         having substantially the same wave configuration, and
         having an inner and an outer connection tab;
      insulation means for electrically insulating winding segments in adjacent conductor layers;
      bridging connections coupling said tabs
         for interconnecting winding segments in two of said conductor layers to form armature turns of a first closed series arrangement, each such armature turn including a winding segment in each of said two layers spaced in accordance with the distance between adjacent pole centers of said magnetic pole faces,
         for interconnecting winding segments in the other two of said conductor layers to similarly form a second closed series arrangement, and
         for interconnecting said first and second closed series arrangements at a plurality of regularly spaced intervals; and
   commutator means for electrically energizing said armature.

9. An electrical machine according to claim 8 wherein bridging connections couple inner tabs of two of said conductor layers,
   separate bridging connections couple inner tabs of the other two of said conductor layers, and
   bridging connections couple outer tabs in each of said four conductor layers.

10. An electrical machine according to claim 8 wherein said commutator means comprises brushes bearing directly against exposed surfaces of said winding segments.

References Cited

UNITED STATES PATENTS

| | | | |
|---|---|---|---|
| 3,144,574 | 8/1964 | Henry-Baudot | 310—268 |
| 3,319,101 | 5/1967 | Bidard | 310—268 |
| 3,382,570 | 5/1968 | Knapp | 310—268 |
| 3,312,846 | 4/1967 | Henry-Baudot | 310—268 |

FOREIGN PATENTS 902,295   8/1962   Great Britain.

OTHER REFERENCES

R. G. Kloeffler et al.: D.C. Machinery, The Macmillan Co., New York, N.Y., 1949, pp. 44–59.

WARREN E. RAY, Primary Examiner

R. SKUDY, Assistant Examiner